United States Patent [19]
Ashall et al.

[11] 3,854,988
[45] Dec. 17, 1974

[54] TREATMENT OF GLASS FIBRES

[76] Inventors: Ronald James Ashall, "Underly," Lime Vale Rd., Wigan; David Ronald Bartlett, 89 Broadway, Eccleston St., Helens, both of England

[22] Filed: Mar. 7, 1973

[21] Appl. No.: 339,388

Related U.S. Application Data

[63] Continuation of Ser. No. 161,344, July 9, 1971, abandoned.

[52] U.S. Cl. 117/126 R, 117/126 GB, 117/126 AB, 260/29.4 R, 260/67 FA, 260/70 R, 260/70 A
[51] Int. Cl. C03c 25/00, C08g 51/24
[58] Field of Search 260/29.4 R, 67 FA, 70 A, 260/70 R; 117/126 GB, 126 GN, 126 AB, 126 R

[56] References Cited
UNITED STATES PATENTS

| | | | |
|---|---|---|---|
| 3,043,804 | 7/1962 | Delmonte | 260/67 FA |
| 3,059,297 | 10/1962 | Dunn et al. | 260/DIG. 40 |
| 3,360,492 | 12/1967 | Tsou | 260/70 A |
| 3,556,754 | 1/1971 | Marsden et al. | 260/29.3 |

*Primary Examiner*—Lorenzo B. Hayes
*Attorney, Agent, or Firm*—Woodard, Weikart, Emhardt & Naughton

[57] ABSTRACT

This invention is concerned with the provision of an improved method of bonding glass wool products by means of a binder composition. In this invention bonding is effected by means of a binder thus formed by diluting a co-polymer resin solution. The co-polymer resin solution is produced by reacting urea with formaldehyde in an aqueous alkaline media in the presence of an amine. The reaction mixture obtained being acidified after which furfuryl alcohol is added. The co-polymer resin is then formed from the furfuryl alcohol and the reaction produced is neutralized to give the desired co-polymer resin solution.

8 Claims, No Drawings

TREATMENT OF GLASS FIBRES

This is a continuation of application Ser. No. 161,344, filed July 9, 1971, now abandoned.

This invention relates to a method of bonding mineral e.g. glass wool products by means of a binder composition, to the binder composition used in carrying out the method and to mineral wool products produced by the method.

In the manufacture of mineral wool products such as glass wool products, the wool is sprayed with a binder which is cured on the product. The binders in day to day use, are based on phenol-formaldehyde, and during the curing stage, phenolic fumes form and equipment must be provided to prevent as far as possible emission of such fumes into the atmosphere.

Attempts have been made to replace such binders with materials which result in less need for control of fume emission in that the fumes produced from the binder are either non-toxic or more easily controllable.

It is of course important to develop a binder which has approximately performance in use as the previously used binders, and this has hindered the development of such replacements.

We have now found it possible to prepare a binder without using a phenol as a raw material which has a performance in use on a weight for weight basis as good as a conventional binder based on a phenol-formaldehyde resin. The cost may be slightly higher but this can be set off against being able to dispense with control measures to prevent emission.

Our invention is based on the use of a furfuryl alcohol modified resin composition as a binder in the production of mineral wool products with a comparable strength to the strengths achieved with conventional phenol-formaldehyde binders.

According to the invention, therefore, we provide a method of bonding mineral wool products in which there is used as a binder, a material formed by the dilution of a copolymer resin solution, which has been produced by the following reaction steps, reacting urea with formaldehyde in an aqueous media at an alkaline pH in the presence of an amine, as a catalyst for at least 30 minutes, acidifying the reaction mixture obtained, and thereafter adding furfuryl alcohol and reacting said furfuryl alcohol to complete the formation of the copolymer resin, finally neutralising the reaction product obtained to give the desired copolymer resin solution.

We prefer to neutralize with an amine such as triethanolamine and the acidification is preferably carried out with formic acid, though other acids such as sulphuric acid may be used.

A polyethylene glycol such as one of the materials known under the trade name "Carbowax" may be added to the acidified mixture to reduce the evolution of dust from the finished product. The setting time of the binder can also be effected by this addition. The molar quantities of Carbowax used where urea is 1 mole, can be in the range .0025 to .006 moles, amounts less than .0025 have little effect while amounts greater than .006 give little advantage in return for the increased quantity of material used.

The alkaline pH used for the initial steps is preferably in the range 8.2 to 8.5, and the reaction time may be about one hour, but can be in the range 30 minutes to 75 minutes. The pH and reaction time for the second step where the furfuryl alcohol is reacted is preferably about pH5 and 2½ hours. At a lower pH a shorter reaction time is possible, and at a higher pH, a longer reaction time is necessary. The range for reaction time is from 2 to 5 hours. The reaction time chosen is therefore correlated with the pH chosen. It is important to ensure that solids do not separate from the solution formed on dilution with water and that the solution should take more than 150 seconds to gel at 150°C.

The ratio of reactants is preferably chosen to give 1 mole urea to 2.5 mole formaldehyde, and in the case of furfuryl alcohol can be 1 mole urea to 0.6 to 1.2 mole furfuryl alcohol. The amount of formaldehyde used can be increased above a 1:2.5 mole ratio of urea to formaldehyde. The upper limit is fixed by the economics of the process, and the amount of free formaldehyde which can be tolerated. If the amount of formaldehyde be reduced below a 1:2.5 mole ratio of urea to formaldehyde, the final resin produced tends to be unstable. A suitable composition is urea 1 mole, furfuryl alcohol 1 mole, formaldehyde 2.5 moles, triethanolamine 0.03 moles, polyethylene glycol 0.005 moles but the percentage of furfuryl alcohol may be varied between 0.6 and 1.2 moles.

The temperature for the first stage of the reaction is normally controlled at about 65° C, but can be varied about 2° C either side of this temperature without deleterious effects i.e. in particular the quality of the final bond produced by the binder formed from the resin. The temperature for the second stage is chosen; at about 80° C but can be varied between 75° and 85° C without effect on the product obtained.

The binder is prepared by diluting the resin solution produced in the manner outlined above with water and adding various constituents which can aid in adjusting the gel time and efficiency of the binder. We prefer to use as a binder a 16 percent by weight solids binder solution, and to adjust to obtain a gel time of about 150 seconds at 150° C. The addition of urea preferably in powder form extends the gel time, and increases the strength of the final bond. 5 to 20 percent (percentages based on solids content of the binder) of dissolved urea powder has been found to give good results. The overall efficiency of the binder is improved by the addition of other binder extenders such as salts of lignosulphonates, e.g. 5 to 10 percent high molecular weight wood derivatives such as the material known under the trade name "Dresinol 48" (Hercules Powder Co.) or at least 5 percent of an ammonium lignosulphonate such as the material known as "Totatin." These materials enable the gel time to be adjusted after the addition of urea.

The binder solution may also contain a silane to improve the adherence of the binder to the glass surface. Ammonium sulphate may also be added to improve bonding properties. A colouring agent can be added to give the finished product a pleasing appearance or desired colour.

The binder solution can be used with advantage to bond glass fibres to form a glass wool product and in one form of carrying out the method, the glass fibers are sprayed with the binder as they fall through a hood onto a moving conveyor and are cured to form a bonded glass wool product. The present invention, therefore, includes a glass wool product comprising glass fibers bonded with a binder as described for use in the above method, and set forth in detail above and the invention also includes the novel binder compositions used in the method of the invention.

The following example illustrates but does not limit the invention.

EXAMPLE

A binder for use in the method of the invention was prepared by first forming a resin in which the reactants used were urea, formaldehyde, and furfuryl alcohol, and the mole ratio of these reactants was 1 to 2.5 to 1. The first stage in forming the resin was to mix together in a stirred reactor pot, 114 lbs urea and 35 gallons of formaldehyde (37 percent concentration). The mixture was adjusted to pH 8.2 by the addition of 9 lbs triethanolamine, and heated for 1 hour to 65° C. The pH was then adjusted to 5 by the addition of 2½ lbs of formic acid (93 percent concentration Specific Gravity 1.22) and 16.5 gallons (185 lbs) furfuryl alcohol added followed by 5.7 lbs of polyethylene glycol to extend the final setting time, and to reduce the amount of dust in the finished product. The mixture was then heated for 2½ hours at 80° C, and at the end of this time, 5 lbs of triethanolamine was added to neutralise and give a pH of 7.2. The final resin solution can be diluted with water without solids separating and has a viscosity in the range 35 to 50 c.p.s. (when measured by a Brookfield Viscometer Spindle No. 1 speed 100 r.p.m.).

This resin solution was used in the formation of a binder. The quantities of material used were as follows:

| | | |
|---|---|---|
| Resin solution | 45 | gallons |
| Ammonia Sp gravity 0.880 | 3 | gallons |
| Ammonium Sulphate solution (approx. 20%) | ¾ | gallon |
| N-Beta (Amino-ethyl) gamma amino propyl trimethoxy silane | 5 | ozs. |
| Urea Powder | 58 | lbs. |
| Emulsified mineral oil 40% w/w (Sp. gr. 0.9) | 7 | gallons |
| Water | 112 | gallons |

The binder contains 16 percent bonding solids, 50 percent of which is urea.

The binder was sprayed onto glass wool as it fell onto a conveyor, and the curing temperature was about 450° F.

The material obtained had a slightly lower initial bond strength, than a similar material produced using a binder containing phenol, but did not fall in strength on weathering as much, so that the final strength is approximately the same, and is in any case over the minimum bond strength required.

We have therefore provided a binder for inorganic fibers comprising a material formed by the dilution of a copolymer resin solution which has been produced by reacting an aldehyde with an amide in an alkaline aqueous medium in the presence of an amine, thereafter acidifying the reaction mixture obtained and subsequently allowing an alcohol to react with the said reaction mixture to complete the formation of the copolymer resin.

What we claim is:

1. A method of bonding mineral wool products using a copolymer resin binder composition formed by
   a. reacting urea with formaldehyde in an aqueous medium for between 30–75 minutes at an alkaline pH value and at a temperature of about 63°C to 67° C in the presence of an amine as a catalyst to form a composition containing a urea-formaldehyde reaction product;
   b. acidifying the composition to an acid pH value by the addition of an acid;
   c. adding furfuryl alcohol and polyethylene glycol to the acidified composition and reacting said alcohol and glycol with the urea formaldehyde reaction product for 2 to 5 hours to form the copolymer resin solution;
   d. adjusting the pH of the solution to substantially neutral;
   e. diluting the solution with water to such an extent that the composition does not take more than 150 seconds to gel at 150° C; and
   f. contacting the mineral wool fibers with the diluted resin solution.

2. A method as claimed in claim 1, in which during the formation of the copolymer resin for use in the binder solution, the reaction mixture is acidified with formic acid, and the final reaction product is neutralised with triethanolamine.

3. A method as claimed in claim 1 in which the reaction with furfuryl alcohol is at a pH of about 5, and temperature in the range 75° to 85° C.

4. A method as claimed in claim 1, in which the ratio of reactants is chosen to give urea 1 mole, formaldehyde 2.5 moles and furfuryl alcohol between 0.6 and 1.2 moles.

5. A method as claimed in claim 1 in which the binder is formed by diluting the copolymer solution to form a 16 percent solids binder solution.

6. A method as claimed in claim 5 in which the binder contains binder extenders such as urea, or salts of lignosulphonates.

7. A method as claimed in claim 1 in which ammonium sulphate is added to the composition.

8. A mineral wool product produced by the method of claim 1.

* * * * *